(12) United States Patent
Liles et al.

(10) Patent No.: US 7,045,060 B1
(45) Date of Patent: May 16, 2006

(54) APPARATUS AND METHOD FOR TREATING A LIQUID

(75) Inventors: John Kevin Liles, Ocala, FL (US); Gregory A. Schmidbauer, Ocklawaha, FL (US)

(73) Assignee: Inflowsion, L.L.C., Ocala, FL (US)

( * ) Notice: Subject to any disclaimer, the term of this patent is extended or adjusted under 35 U.S.C. 154(b) by 6 days.

(21) Appl. No.: 10/728,688

(22) Filed: Dec. 5, 2003

Related U.S. Application Data

(60) Provisional application No. 60/431,689, filed on Dec. 5, 2002.

(51) Int. Cl.
*C02F 1/52* (2006.01)

(52) U.S. Cl. .................. 210/199; 210/206; 210/258; 366/339

(58) Field of Classification Search ............. 210/726, 210/727, 738, 199, 206, 219, 258; 366/336, 366/338, 339, 341; 138/38
See application file for complete search history.

(56) References Cited

U.S. PATENT DOCUMENTS

| | | | |
|---|---|---|---|
| 650,575 A | 5/1900 | Whitney |
| 770,599 A | 9/1904 | Monteagle |
| 1,279,710 A | 9/1918 | Kirke |
| 1,363,416 A | 12/1920 | Hooker |
| 1,713,456 A | 5/1929 | Strindlund |
| 1,853,045 A | 4/1932 | Gnau |
| 2,119,864 A | 6/1938 | Kleucker |
| 2,252,045 A | 8/1941 | Spanner |
| 2,425,298 A | 8/1947 | Attridge et al. |
| 2,661,194 A | 12/1953 | Katovsich |
| 2,744,391 A | 5/1956 | Deane |
| 2,933,293 A | 4/1960 | Ferrari, Jr. |
| 2,983,993 A | 5/1961 | Johnson |
| 2,983,994 A | 5/1961 | Johnson |
| 3,337,194 A | 8/1967 | Zavasnik et al. |
| 3,343,250 A | 9/1967 | Berto et al. |
| 3,460,809 A | 8/1969 | Hauss |
| 3,553,976 A | 1/1971 | Cumine et al. |
| 3,578,075 A | 5/1971 | Winter |
| 3,612,175 A | 10/1971 | Ford et al. |
| 3,632,090 A | 1/1972 | White |
| 3,647,187 A | 3/1972 | Dannewitz et al. |
| 3,664,638 A | 5/1972 | Grout et al. |
| 3,762,468 A | 10/1973 | Newson et al. |
| 3,800,985 A | 4/1974 | Grout et al. |
| 3,908,702 A | 9/1975 | Klosse et al. |
| 4,072,296 A | 2/1978 | Doom |

(Continued)

*Primary Examiner*—Peter A. Hruskoci
(74) *Attorney, Agent, or Firm*—Frijouf, Rust & Pyle, P.A.

(57) ABSTRACT

An apparatus and method is disclosed for treating a liquid with a first and a second chemical. A liquid to be treated flows into a first inlet port of an intake manifold. A second inlet port of the intake manifold introduces a first chemical into the liquid. A first static mixing device comprising a spirally twisted tube forming a plurality of helixes and having an inlet port connected in fluid communication with an outlet port of the intake manifold is provided for mixing the first chemical with the liquid. The outlet port of the first static mixing device is connected to a first inlet port of an interconnecting manifold. A second inlet port of the interconnecting manifold introduces a second chemical into the liquid. A second static mixing device has an inlet in fluid communication with an outlet port of the interconnecting manifold for mixing the second chemical with the liquid and for eluting the treated liquid from an outlet port of the second static mixing device.

15 Claims, 4 Drawing Sheets

U.S. PATENT DOCUMENTS

| | | |
|---|---|---|
| 4,093,188 A | 6/1978 | Horner |
| 4,111,402 A | 9/1978 | Barbini |
| 4,112,520 A | 9/1978 | Gilmore |
| 4,165,360 A | 8/1979 | Casper et al. |
| 4,179,222 A | 12/1979 | Strom et al. |
| 4,259,024 A | 3/1981 | Clasen et al. |
| 4,264,212 A | 4/1981 | Tookey |
| 4,305,460 A | 12/1981 | Yampolsky |
| 4,422,773 A | 12/1983 | Cassaday et al. |
| 4,462,903 A | 7/1984 | Wettengl |
| 4,511,258 A | 4/1985 | Federighi et al. |
| 4,576,714 A | 3/1986 | Pohoreski |
| 4,599,773 A | 7/1986 | Sievers |
| 4,688,319 A | 8/1987 | Gross et al. |
| 4,710,290 A | 12/1987 | Briltz |
| 4,840,493 A | 6/1989 | Horner |
| 4,865,460 A | 9/1989 | Friedrich |
| 4,929,088 A | 5/1990 | Smith |
| 4,936,689 A | 6/1990 | Federighi et al. |
| 4,981,368 A | 1/1991 | Smith |
| 5,013,429 A | 5/1991 | Krofta |
| 5,069,881 A | 12/1991 | Clarkin |
| 5,120,436 A | 6/1992 | Reichner |
| 5,145,256 A | 9/1992 | Wiemers et al. |
| 5,193,588 A | 3/1993 | Kanao |
| 5,326,537 A | 7/1994 | Cleary |
| 5,330,267 A | 7/1994 | Tauscher |
| 5,551,504 A | 9/1996 | Zifferer |
| 5,695,645 A * | 12/1997 | Bober et al. ................ 210/710 |
| 5,720,886 A * | 2/1998 | Iwinski ...................... 210/727 |
| 5,758,695 A | 6/1998 | Carson |
| 5,765,946 A | 6/1998 | Lott |
| 5,800,059 A | 9/1998 | Cooke et al. |
| 5,960,870 A | 10/1999 | Takahashi et al. |
| 6,280,615 B1 | 8/2001 | Phillips et al. |
| 6,331,072 B1 | 12/2001 | Schierholz et al. |
| 6,332,980 B1 * | 12/2001 | Moorehead ................. 210/104 |
| 6,346,197 B1 | 2/2002 | Stephenson et al. |
| 6,368,511 B1 * | 4/2002 | Weissenberg et al. ...... 210/759 |
| 6,387,274 B1 * | 5/2002 | Hendricks et al. ......... 210/709 |
| 6,395,175 B1 | 5/2002 | Gao et al. |
| 6,419,831 B1 * | 7/2002 | Wang ........................ 210/668 |
| 6,454,949 B1 * | 9/2002 | Sesay et al. ................ 210/709 |

* cited by examiner

APPARATUS AND METHOD FOR TREATING A LIQUID

CROSS-REFERENCE TO RELATED APPLICATIONS

This application claims benefit of U.S. Patent Provisional application Ser. No. 60/431,689 filed Dec. 5, 2002. AU subject matter set forth in provisional application Ser. No. 60/431,689 is hereby incorporated by reference into the present application as if fully set forth herein.

BACKGROUND OF THE INVENTION

1. Field of the Invention

This invention relates to chemical mixing, and more particularly to the treatment of a liquid with a chemical.

2. Background of the Invention

The treatment and disposal of wastewater is an ever increasing problem as the population and subsequent urbanization increases. Ultimate disposal of wastewater is either to discharge into a surface body of water or in some areas subsurface disposal is utilized. In both instances, treatment of wastewater prior to disposal is mandatory to prevent both the water quality and the health and safety of the public to be compromised. Wastewater contains, among other contaminants, suspended particulate matter, biodegradable organic material and pathogenic bacteria. The pathogenic bacteria must be destroyed and particulates and biodegradables must be removed in order to achieve the effluent water quality standards required for environmental release. Additionally, removal of toxic and industrial wastes as well as nitrates and phosphates must be accomplished prior to release.

There are three levels of wastewater treatment, namely a primary level of treatment, a secondary level of treatment and a tertiary level of treatment. The primary level of treatment is usually a first step in the treatment of wastewater. The primary level of treatment removes approximately 60 percent of the total suspended solids and about 35 percent of the BOD (Biochemical Oxygen Demand) materials. After the primary level of treatment, dissolved impurities remain in the wastewater.

The secondary level of treatment removes approximately 85 percent of both the solid suspended matter and BOD. The secondary level of treatment is the generally required minimum in developed countries such as the United States.

The tertiary level of treatment is used to provide cleaner water. Although the tertiary level of treatment is expensive, very often doubling the cost of the secondary treatment, the effluent water discharged from the tertiary level of treatment is of near drinking water quality.

A final step in the wastewater treatment process is an effluent disinfection process. The effluent disinfection process normally requires the effluent to be mixed with chlorine gas in a contact tank. Unfortunately, chlorine gas leaves a chlorine residue that may have adverse effects on aquatic life. Other forms of effluent disinfection such as ultraviolet radiation are becoming competitive with the use of chlorine gas.

One example of these new techniques is Primary treatment removal of material which floats on the surface of the wastewater, or material that settles out due to the force of gravity. These treatments include the processes of comminuters, or grinding the waste, screening, grit removal and sedimentation.

Secondary wastewater treatment comprises the removal of colloidal particles. A colloidal dispersion is a suspension of finely divided particles in a continuous medium. The particles typically range in size between $10^{-4}$ to $10^{-7}$ centimeters. Since the particles have a net electrical charge, the particles tend to repel each other, and tend to stay in suspension, rather than coagulate and precipitate. The charge on the suspended particles can be neutralized through the addition of an electrolyte to the suspension. Following the neutralization of the suspended particles, the particles begin to coagulate and form larger particles.

Several secondary treatment processes have been developed to remove contaminants from the wastewater. In one process, an electrolyte is added and mixed with the wastewater to neutralize the suspended particle charge. After the charge on the suspended particle is neutralized, an anionic polymer is added and mixed with the wastewater. The anionic polymer results in the further particle association and the formation of loose aggregations or soft flakes of particles called flocculates or flocs. The flocs with a density greater than water settle and form sludge, while the less dense material rises to the surface and forms a scum. Both the sludge and scum are readily removed from the water for disposal, while the water is further processed as needed.

The prior art addresses many of the concerns in the treatment of wastewater, however several problems associated with these processes have not been answered. Among these problems is the build-up of material on and around the internal mechanisms associated with the process. The following U.S. Patents represent some of the attempts of the prior art to resolve the above problems.

U.S. Pat. No. 4,111,402 to Richard J. Barbini teaches a motionless mixer for combining different substances brought into communication therewith. The mixer includes at least two tubular members. Each tubular member has at least one spiral corrugated surface thereon. The members are arranged so that different substances brought into and out of communication therewith including the at least one corrugated surface will be mixed together.

U.S. Pat. No. 4,462,903 to Dietmar Wettengl teaches a device for the catalytic oxidation purification of waste water inside a reaction vessel. The vessel includes a front wall, a back wall, two side walls interconnecting the front and back wall and a bottom. The waste water is admitted into the vessel through admitting means located on the front wall and discharged through discharge means located on the back wall. The vessel is divided into a plurality of compartments each of which includes a pair of risers which are divided by a plurality of partitions to form a plurality of sub-chambers. The partitions include an oscillatable flap or, alternatively, are tilted in a direction opposite to the direction of flow of the water in the vessel. In this manner, entrapment of the catalyst particles is prevented.

U.S. Pat. No. 4,576,714 to Anton P. Pohoreski teaches a novel sewage purification system. The system includes a pump for drawing sewage into the system and an injection inlet for injecting chemical into the effluent line from the pump. The pump leads to a pair of interconnected U-shaped mixing chambers connected to the effluent line from the pump, the U-shaped mixing chambers being baffled and being of a particular construction. There is also a recycle line from the inlet line to the mixing chambers back to the pump for recycling about 1–20% of the total flow rate, which is generally about 5–40 gallons/minute through the system. The U-shaped mixing chambers are also provided with at least two injection inlets for injecting chemicals thereinto. A splitter chamber is connected to the outlet from the mixing chambers to provide a pair of parallel flow outlets therefrom. A separator chamber is connected to the parallel flow outlets, the separator chamber having structure therein for providing tangential flow along the inside walls and also for separating sludge therefrom and for withdrawing it from the bottom thereof, and for withdrawing clean water from the upper central core thereof. Finally, a sludge removal line is provided, along with a sludge recycle line for recycling about 1–20% of the sludge back to the pump inlet line.

U.S. Pat. No. 4,710,290 to Raymond P. Briltz teaches chemicals added to a fluid such as sewage to flocculate and precipitate solids therefrom. The solids are deflected downwardly and sink by gravity to the base of an elongated chamber so that the substantially clarified fluid flows over a weir at one end of the chamber with the flocculated and precipitated material forming a sludge in the base thereof. Whereafter, the sludge may be removed either through a fluid lock device or pressurizing the system to stratify the flow and provide still areas for the sludge to settle through the fluid and be removed as required.

U.S. Pat. No. 5,013,429 to Milos Krofta teaches an apparatus and method for stabilizing sludge such as the sludge produced by municipal waste water treatment plants. It includes thickening of the sludge to a dry solid content in the range of 3% to 8% before feeding it to at least one comparatively small reactor tank that extends horizontally and has an inlet and outlet adjacent opposite end walls. The system preferably utilizes multiple tanks stacked one above the other and connected in series. The tanks have an in-built mixer that sweeps through the interior of the tank. The mixer is eccentrically mounted so that its mixing members carry the sludge through the uppermost portion of the tank interior and are spaced from the bottom surface of the tank. A sparger is located either in the inlet or in the bottom clearance of the tank to introduce microscopic bubbles of oxygen and ozone into the sludge. A pressure regulating valve controls the flow of the stabilize sludge from the uppermost reactor tank. The pressure regulating valve and the metering pump together maintain a hyperbaric pressure within the tanks.

U.S. Pat. No. 5,120,436 to Thomas W. Reichner teaches contaminated liquid or sludge clarification accomplished by the use of a basic one or a series of operatively connected and vertically extending units or devices of the invention. Each of which employs a hose that is spiraled around a cylindrical container wall whose upper end is open to an overflow weir from which recovery of lower specific gravity clarified liquid is effected and whose lower end is open and connected to a cone or funnel-shaped wall that defines a receiving and delivering chamber for separated-out heavier specific gravity contaminating liquid, sediment, viscous or thickened material. The hose of the basic unit is adapted at its upper end to receive the contaminated liquid, sludge or the like and any suitable chemical flocculant, precipitant, or coagulant, such as a polyelectrolyte, that may be injected or added to the contaminated liquid before it is introduced therein. The hose is adapted to thoroughly mix the heavier specific gravity material content with the coagulant as the liquid charge moves downwardly in a somewhat slowly swirling path therein. A nozzle is connected to the lower end and along the inside of a lower end portion of the cylindrical wall to deliver its contents in a substantially vertically laminated relation within the container above and adjacent to an upper end portion of the cone-shaped wall.

U.S. Pat. No. 5,145,256 to Wiemers et al. teaches an apparatus and method for treating effluents for selective solids control and/or dewatering of effluents, for example drilling fluids (or mud), slurries or sludges, or other clean up involving solids removal from a hydraulic system where flocculation would be employed. The apparatus is compact and portable for ease of on-site delivery and hookup and includes a plurality of mixers for mixing polymer materials with water and/or the effluent, a plurality of pumps for controlling the flow of effluents, water and mixed liquids, and a plurality of conveniently located valves and pump controls for control of the various functions of the apparatus from a centrally located control panel. An improved mixing device is provided for blending of shear-sensitive fluids which includes multi-port injection sites and a series of geometrical flow altering elements. A device for wetting dry particulate material in a liquid feed stream is provided having a cylindrical funnel eductor and a cyclonic dispersal eductor.

U.S. Pat. No. 5,145,256 to Wiemers et al. teaches an apparatus and method for treating effluents for selective solids control and/or dewatering of effluents, for example drilling fluids (or mud), slurries or sludges, or other clean up involving solids removal from a hydraulic system where flocculation would be employed. The apparatus is compact and portable for ease of on-site delivery and hookup and includes a plurality of mixers for mixing polymer materials with water and/or the effluent, a plurality of pumps for controlling the flow of effluents, water and mixed liquids, and a plurality of conveniently located valves and pump controls for control of the various functions of the apparatus from a centrally located control panel. An improved mixing device is provided for blending of shear-sensitive fluids which includes multi-port injection sites and a series of geometrical flow altering elements. A device for wetting dry particulate material in a liquid feed stream is provided having a cylindrical funnel eductor and a cyclonic liquid flowing through the chamber.

Therefore, it is an object of the present invention to provide an improved apparatus and method for the treatment of a liquid that overcomes the inadequacies of the prior art and provides a significant contribution to the art.

Another object of this invention is to provide an improved apparatus and method that is suitable for treating wastewater.

Another object of this invention is to provide an improved apparatus that provides a substantially reduced flow restriction to matter flowing therethrough.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

A specific embodiment of the present invention is shown in the attached drawings. For the purpose of summarizing the invention, the invention relates to an improved method and apparatus for treating a liquid with a first and a second chemical. A liquid pump is provided for pumping the liquid into a first inlet port of an intake manifold. A second inlet port of the intake manifold introduces a first chemical into the liquid. A first static mixing device comprises a spirally twisted tube forming a plurality of helixes. An inlet port of the first static mixing device is connected in fluid communication with an outlet port of the intake manifold is provided for mixing the first chemical with the liquid. The outlet port of the first static mixing device is connected to a first inlet port of an interconnecting manifold. A second inlet port of the interconnecting manifold introduces a second chemical into the liquid. A second static mixing device has an inlet in fluid communication with an outlet port of the interconnecting manifold for mixing the second chemical with the liquid and for eluting the treated liquid from an outlet port of the second static mixing device.

In a more specific embodiment of the invention, each of the first and second static mixing devices comprises a tube having a polygonic cross-section including a square cross section, spirally twisted for forming a plurality of helixes extending between the inlet port and the outlet port. The spirally twisted tube of the first and second static mixing device imparts a helical flow to the liquid between the inlet port and the outlet port for mixing the chemical with the liquid.

In one embodiment of the invention, the second static mixing device has a cross-section greater than the first static mixing device for providing a high shear first static mixing device and providing a low shear second static mixing device.

In a more specific embodiment of the invention, the one of the first and second static mixing devices comprises a first and a second spirally twisted tube section. The first tube section is spirally twisted in a first direction for causing the liquid flowing through the first tube section to flow in a first helical direction. The second tube section is spirally twisted in a second direction for causing the liquid flowing through the second tube section to flow in a second helical direction.

The invention is also incorporated into the method of treating a liquid comprising injecting a first chemical into the liquid and mixing within a high shear first static mixing device. A second chemical is injected into the mixed liquid and first chemical to be mixed in a low shear second static mixing device.

In another embodiment invention is also incorporated into the method of treating wastewater comprising pumping wastewater into an intake manifold. A first chemical (iron chloride/calcium chloride) is injected into the intake manifold and is mixed with the wastewater in a high shear first static mixing device. The method further comprises injecting an anionic polymer into a manifold interconnecting the second end of the high shear first static mixing device and the first send of a low shear second static mixing device. A second chemical (anionic polymer) is injected and mixed with the wastewater and a first chemical in a low shear second static mixing device. The treated wastewater is eluted from the second end of the low shear second static mixing device.

In still another embodiment the invention is also incorporated into the method of mixing and diluting a chemical in water comprising pumping water into a first end of a static mixing device, injecting a liquid chemical into the first end of the static mixing device; and collecting the diluted chemical in water from a second end of a static mixer.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
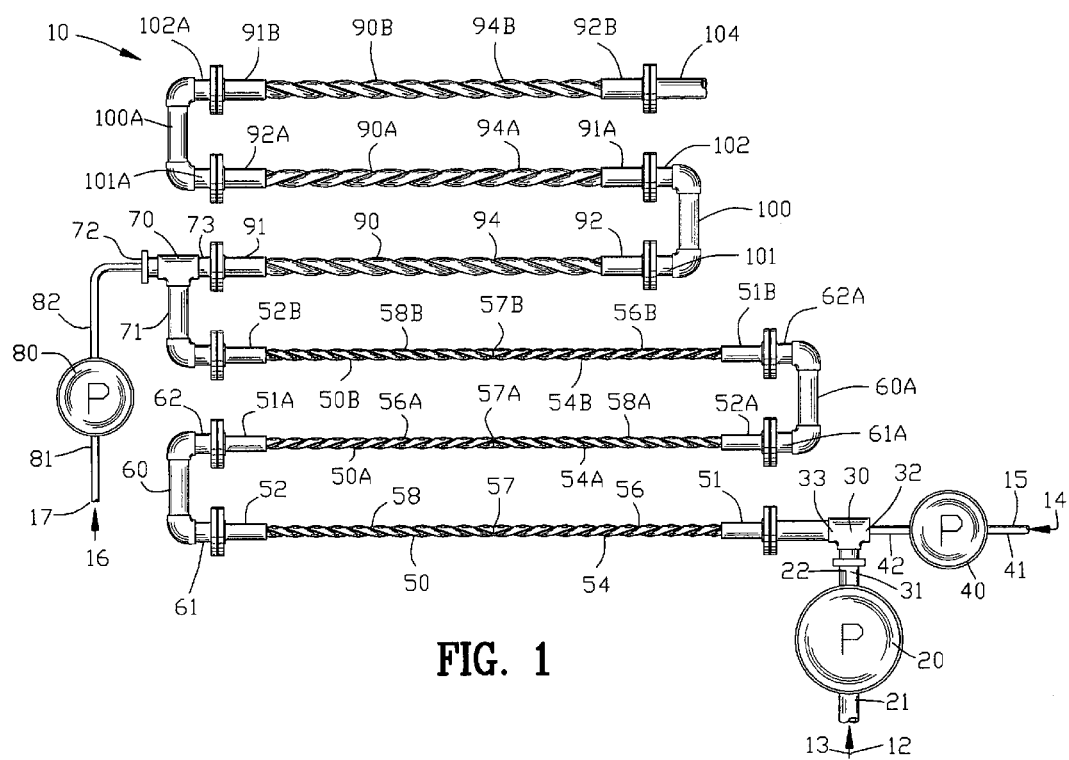
FIG. 1 is an elevation view of a first embodiment of an apparatus for treating a liquid with a first and a second chemical.

FIG. 1 illustrates a first embodiment of an apparatus 10 for treating a liquid 12 from a liquid source 13 with a first chemical 14 from a first chemical source 15 and a second chemical 16 from a second chemical source 17. The apparatus 10 is suitable for treating a liquid 12 such as wastewater in a secondary wastewater treatment.

A pump 20 comprises a pump inlet 21 and a pump outlet 22 with the pump inlet 21 being connected to the liquid source 13. An intake manifold 30 comprises a first inlet port 31, a second inlet port 32 and an outlet port 33. The liquid pump outlet 22 is in fluid communication with the first inlet port 31 of the intake manifold 30.

A first chemical pump 40 comprises a pump inlet 41 and a pump outlet 42 with the pump inlet 41 being connected to the first chemical source 15. The first chemical 14 is pumped from the first chemical source 15 through the first chemical pump inlet 41 by the first chemical pump 40. The pump outlet 42 is in fluid communication with a second inlet port 32 of the intake manifold 30 to inject the first chemical 14 into the liquid 12 within the manifold 30.

The liquid 12 and the chemical 14 exit from the manifold outlet port 33 of the manifold 30. When the apparatus is used for treating wastewater, the first chemical 14 may be an iron chloride and/or calcium chloride combination or any other suitable chemical having the appropriate ionic characteristics. The ionic characteristics of these compounds negate the charges on the colloidal particles in the wastewater stream. The neutralization of charge on the particles eliminates the mutual repulsion of the particles and allows the particles to loosely associate into particles larger than the $10^{-7}$ to $10^{-4}$ centimeter colloidal particle size. The resulting particles are termed pin floc.

The first static mixing device 50 extends between an inlet port 51 and an outlet port 52. The first static mixing device 50 comprises a tube 54 having a polygonic cross-section, which may be a square cross-section, spirally twisted for forming a plurality of helixes. The helixes extend between the inlet port 51 and the outlet port 52 of the first static mixing device 50. The tube 54 comprises a first section 56 connected by a tube connection 57 to a second tube section 58.

The inlet port 51 of the first static mixing device 50 is in fluid communication with the manifold outlet port 33. The first section 56 of the tube is spirally twisted in a first direction for causing the liquid 12 flowing through the first tube section 56 to flow in a first helical direction. The second tube section 58 is spirally twisted in a second direction for causing the liquid 12 flowing through the second tube section 58 to flow in a second helical direction. The first helical flow of the liquid 12 through the first tube section 56, the flow reversal at the flow connection 57 and the second helical flow of the liquid through the second tube section 58 results in high shear mixing of the liquid 12 and the first chemical 14.

A connecting tube 60 has an inlet port 61 and an outlet port 62 with the inlet port 61 being affixed to and in fluid communication with the outlet port 52 of the first static mixing device 50. The outlet port 62 of the connecting tube 60 is affixed to and in fluid communication with the inlet port 51A of a supplemental first static mixing device 50A. Preferably, the supplemental first static mixing device 50A is identical to the first static mixing device 50 with similar parts being labeled with similar reference characters.

A connecting tube 60A has an inlet port 61A and an outlet port 62A with the inlet port 61A being affixed to and in fluid communication with the outlet port 52A of the supplemental first static mixing device 50A. The outlet port 62A of the connecting tube 60A is affixed to and in fluid communication with the inlet port 51B of an additional supplemental first static mixing device 50B. Preferably, the additional supplemental first static mixing device SOB is identical to the first static mixing device 50 with similar parts being labeled with similar reference characters.

It should be understood that a series having varying numbers of interconnected first static mixing devices 50, 50A and 50B and connecting tubes 60 and 60A may be utilized to achieved the desired length of static mixing and the required level of high shear mixing.

An interconnecting manifold 70 comprises a first inlet port 71, a second inlet port 72 and an outlet port 73. The outlet port 52B of the first static mixing device SOB is affixed to and has fluid communication with the first inlet port 71 of the interconnecting manifold 70.

A second chemical pump 80 comprises a pump inlet 81 and a pump outlet 82 with the pump inlet 81 being connected to the second chemical source 17. The second chemical 16 is pumped from the second chemical source 17 through the second chemical pump inlet 81 by the second chemical pump 80. The pump outlet 82 is in fluid communication with the second inlet port 72 of the interconnecting manifold 70 to inject the second chemical 16 into the mixture of the liquid 12 and the first chemical 14. The mixed liquid 12 and first chemical and the injected second chemical 16 exit from the interconnecting manifold 70 through the interconnecting manifold outlet port 73. When treating wastewater, the second chemical 16 may be an anionic polymer for producing flocculation or further aggregation of the pin floc.

The second static mixing device 90 extends between an inlet port 91 and an outlet port 92. The second static mixing device 90 comprises a tube 94 having a polygonic cross-section, which may be a square cross-section, spirally twisted for forming a plurality of helixes. The helixes extend between the inlet port 91 and the outlet port 92 of the second static mixing device 90.

The second static mixing device 90 may have a greater cross-sectional area than the first static mixing device 50. The greater cross-sectional area of the static mixing device 90 produces a low shear rolling mixing action between the mixed liquid 12 and first chemical 14 with the second chemical 16 when compared to the high shear mixing action of the first static mixing device 50.

A connecting tube 100 has an inlet port 101 and an outlet port 102 with the inlet port 101 being affixed to and in fluid communication with the outlet port 92 of the second static mixing device 90. The outlet port 102 of the connecting tube 100 is affixed to and in fluid communication with the inlet port 91A of a supplemental second static mixing device 90A. Preferably, the supplemental second static mixing device 90A is identical to the second static mixing device 90 with similar parts being labeled with similar reference characters.

A connecting tube 100A has an inlet port 101A and an outlet port 102A with the inlet port 101A being affixed to and in fluid communication with the outlet port 92A of the supplemental second static mixing device 90A. The outlet port 102A of the connecting tube 100A is affixed to and in fluid communication with the inlet port 91B of an additional supplemental second static mixing device 90B. Preferably, the additional supplemental second static mixing device 90B is identical to the second static mixing device 90 with similar parts being labeled with similar reference characters.

It should be understood that a series having varying numbers of interconnected first static mixing devices 90, 90A and 90B and connecting tubes 100 and 100A may be utilized to achieved the desired length of static mixing and the required level of low shear mixing.

The outlet port 92B of the final second static mixing device 90B is affixed to and has fluid communication with the exit piping 104. When treating wastewater, the eluent entering the exit piping 104 comprises water and the floc. The eluent is typically returned to a settling tank (not shown) where the solids are allowed to settle. The supernatant liquid is decanted and may require further treatment such as chlorination and the like. Thereafter, the precipitated solids are appropriately disposed in a landfill or the like.

Figures 2, 3:
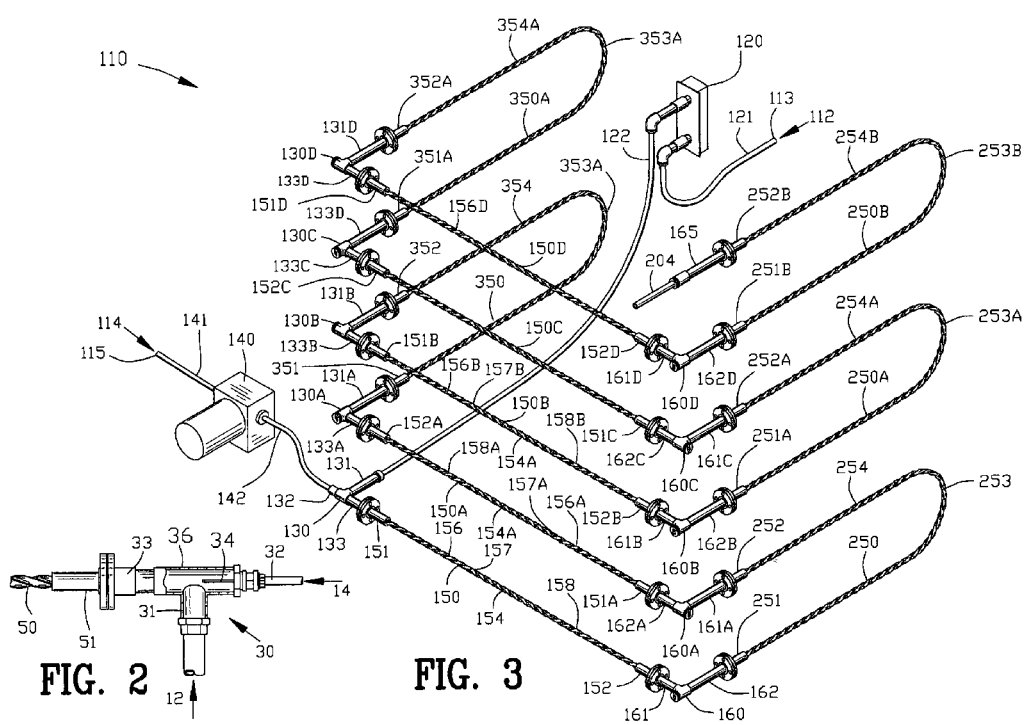
FIG. 2 is a partially cutaway view of an intake manifold of the present invention.
FIG. 3 is an isometric view of a second embodiment of an apparatus for mixing a liquid with a first chemical.

FIG. 2 is a partially cut-away view of the rapid mixing intake manifold 30 of FIG. 1. The rapid mixing intake manifold 30 comprises a first inlet port 31, a second inlet port 32, and an exit port 33. The second inlet port 32 has fluid communication with an injection tube 34 internal to the rapid mixing intake manifold body 36. The liquid 12 enters the first inlet port 31 at right angles to the body 36 of the rapid mixing intake manifold 30. The chemical 14 enters the rapid mixing intake manifold 30 through the second inlet port 32 and enters the flow stream of the liquid 12 through the injection tube 34. The turbulence caused by the liquid 12 entering the rapid mixing intake manifold body 36 at a right angle combined with the high velocity chemical 14 injection through the injection tube 34 effects a rapid mixing of the chemical 14 and the liquid 12 prior to being discharged from the rapid mixing intake manifold outlet port 33 into inlet port 51 of the first static mixing device 50.

FIG. 3 is an isometric view of a second embodiment of an apparatus 110 for mixing a liquid 112 with a first chemical 114. Similar parts are labeled with similar reference characters raised by 100 relative to the first embodiment shown in FIG. 1. A liquid 112 is delivered from a liquid source 113 and flows through an inlet 121 to a flow meter/controller 120. The flowmeter/controller 120 measures and regulates the volume of the liquid 112 entering the apparatus 110. An outlet 122 of the flow meter/controller 120 is in fluid communication with a first inlet port 131 of a rapid mixing intake manifold 130. The intake manifold 130 is similar to the intake manifold 30 shown in FIG. 2.

A chemical metering pump 140 comprises a pump inlet 141 and a pump outlet 142. The first chemical 114 is pumped from a first chemical source 115 through the chemical metering pump inlet 141 by the chemical metering pump 140. The first chemical 114 may be an anionic polymer or any other suitable chemical. The chemical metering pump 140 accurately regulates the flow of the chemical 114 into the apparatus 110. The chemical metering pump outlet 142 is in fluid communication with a second inlet port 132 of the rapid mixing intake manifold 130. The first chemical 114 is rapidly injected perpendicular into the liquid 112 flow to rapidly mix within intake manifold 130. The liquid 112 and the chemical 114 exit from the rapid mixing manifold 130 through the manifold outlet port 133.

A first static mixing device 150 extends between an inlet port 151 and an outlet port 152. The first static mixing device 150 comprises a tube 154 having a polygonic cross-section spirally twisted for forming a plurality of helixes. The helixes extend between the inlet port 151 and the outlet port 152 of the first static mixing device 150. The tube 154 comprises a first tube section 156 connected by a second tube section 157 to a third tube section 158.

The inlet port 151 of the first static mixing device 150 is in fluid communication with the manifold outlet port 133. The first tube section 156 of the first static mixing device 150 is spirally twisted in a first direction whereas the second tube section 157 is spirally twisted in a second direction. The third tube section 158 of the first static mixing device 150 is spirally twisted in a first direction. As previously described, the reversal of the helical flow of the liquid 112 through the first tube section 156, the second tube section 157, and the third tube section 158 results in high shear mixing of the liquid 112 and the first chemical 114.

A connecting tube 160 has an inlet port 161 and an outlet port 162. The inlet port 161 of the connecting tube 160 is affixed to and in fluid communication with the outlet port 152 of the first static mixing device 150. Preferably, the connecting tube 160 provides a rapid mixing action. The connecting tube 160 may be a modification of the rapid mixing inlet manifold 130 as will be discussed hereinafter.

The outlet port 162 of the connecting tube 160 is affixed to and in fluid communication with the inlet port 251 of a second static mixing device 250. The second static mixing device 250 extends between the inlet port 251 and an outlet port 252. The second static mixing device 250 comprises a tube 254 having a polygonic cross-section spirally twisted for forming a plurality of helixes. The helixes extend between the inlet port 251 and the outlet port 252 of the first static mixing device 250. The tube 254 includes an intermediate arcuate portion 253. In this example, the intermediate arcuate portion 253 is formed in a U-shape having a 180 degree bend.

A connecting tube 160A has an inlet port 161A and an outlet port 162A. Preferably, the connecting tube 160A is substantially identical to the connecting tube 160. The inlet port 161A of the connecting tube 160A is affixed to and in fluid communication with the outlet port 252 of the second static mixing device 250. The outlet port 162A of the connecting tube 160A is affixed to and in fluid communication with the inlet port 151A of a third static mixing device 150A. Preferably, the third static mixing device 150A is identical to the first static mixing device 150.

A connecting tube 130A has an inlet port 133A and an outlet port 131A. Preferably, the connecting tube 130A is substantially identical to the connecting tube 160. The inlet port 133A of the connecting tube 130A is affixed to and in fluid communication with the outlet port 152A of the third static mixing device 150A. The outlet port 131A of the connecting tube 130A is affixed to and in fluid communication with the inlet port 351 of a fourth static mixing device 350. Preferably, the fourth static mixing device 350 is identical to the second static mixing device 250.

The outlet port 352 of a fourth static mixing device 350 is connected through a connecting tube 130B to an inlet port 151B of a fifth static mixing device 150B. The fifth static mixing device 150B is connected by a connecting tube 160B to a sixth static mixing device 250A. The sixth static mixing device 250A is connected by a connecting tube 160C to a seventh static mixing device 150C. The seventh static mixing device 150C is connected by a connecting tube 130C to an eigth static mixing device 350A.

The continuation in the series of interconnected static mixing devices is dependent upon the total length of static mixing devices required to achieve the amount of mixing required and the volume throughput of the liquid 112 and the chemical 114.

In this example, the apparatus 110 comprises five static mixing devices 150, 150A, 150B, 150C and 150D having a straight configuration and having directional reversal as previously described and 5 static mixing devices 250, 250A, 250B, 350 and 350A having an arcuate U-shaped configuration.

Fabrication of a static mixing device comprises filling a straight tube of appropriate length and having a polygonic cross-section with a granular incompressible solid material such as sand or the like. The filled tube is then affixed to an axial twisting apparatus at a first and a second tube end. Axially twisting the tube produces a plurality of helixes, resulting in a straight configuration static mixing device. If a U-shaped mixing device is desired, the filled straight static mixing device is formed about a mandrill of appropriate diameter into a U-shaped static mixing device. Removal of the granular solid fill material completes the fabrication of a static mixing device.

It should be appreciated by those skilled in the art that numerous variation in the number, type and arrangement of static mixing devices may be utilized to controls the degree of shear incorporated in the mixing process. It should be understood that both straight pipe and U-shaped static mixing devices may be constructed incorporating single or multiple flow reversal sections. An exit port 252B of the static mixing device 250B is affixed to an exit piping 204.

Apparatus 110 is suitable for use in diluting an anionic polymer material in water for use in a wastewater treatment. Conventional wastewater treatment facilities generally utilize a batch process where and a quantity of polymer material is added to a tank containing the water diluent. Mixers in the tank agitate the materials until homogeneous solution is obtained. Samples are then taken and the solution adjusted through the addition of water or polymer material. Apparatus 110 provides a continuous mixing process where the solution eluting the exit piping may be adjusted through the increase or decrease in flow of the metering pump 140. The metering pump 140 controls the concentration of the chemical 114 in the final chemical 114 and liquid 112 mixture, whereas the flow meter/controller 120 controls the flow rate of the volume of liquid 112 through the apparatus 110.

Figure 4:
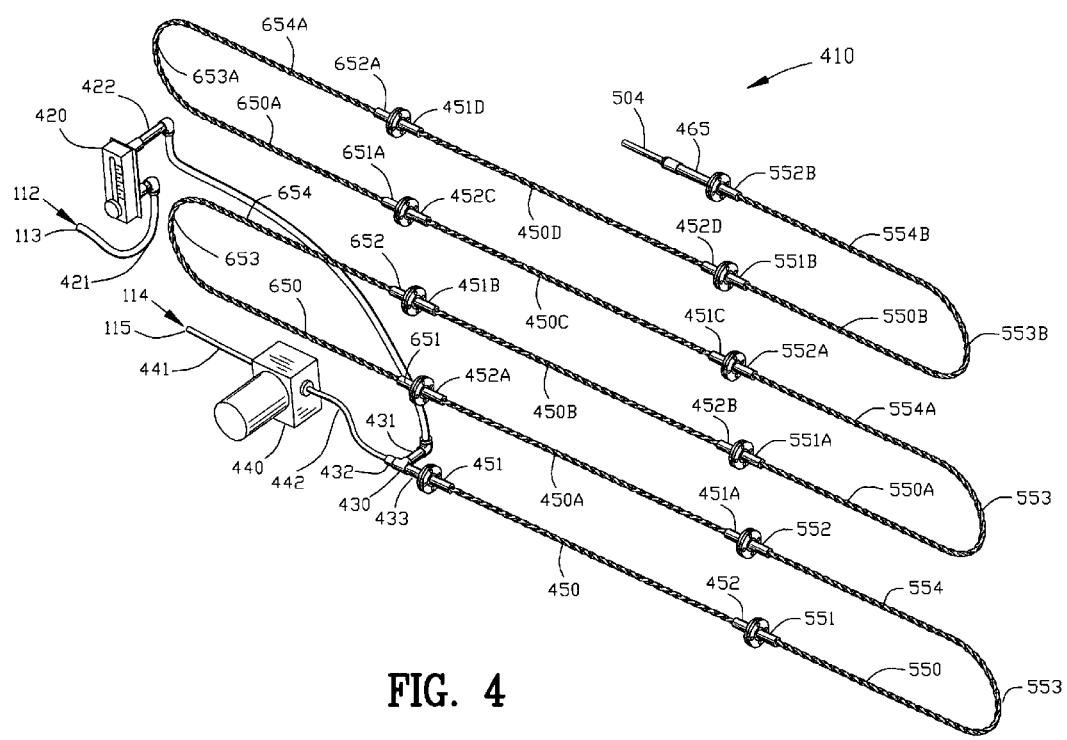
FIG. 4 is an isometric view of a third embodiment of an apparatus for mixing a liquid with a first chemical

FIG. 4 is an isometric view of a third embodiment of the invention illustrating an apparatus 410 for mixing a liquid 112 with a first chemical 114. Similar parts are labeled with similar reference characters raised by 300 relative to the second embodiment shown in FIG. 3.

In contrast to the apparatus 110 in FIG. 3, the apparatus 410 in FIG. 4 has a planar configuration. All of the static mixing devices are contained within a plane enabling the apparatus 410 to be mounted on a planar surface such as a wall, ceiling, divider or any suitable planar surface. The planar configuration of the static mixing of the apparatus 410 minimizes floor area required for installation. The configuration of apparatus 410 includes the rapid mixing of the arcuate connecting tubes (250, 250A, 350, etc) shown in FIG. 3. The operation of the apparatus 410 is substantially identical to the apparatus 110 of FIG. 3.

Figure 5:
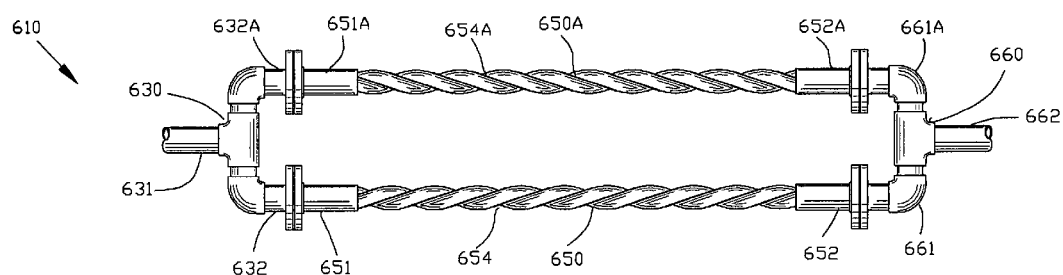
FIG. 5 is an elevation view of a fourth embodiment of an apparatus for mixing a liquid comprising a plurality of parallel static mixing devices.
Figure 6:
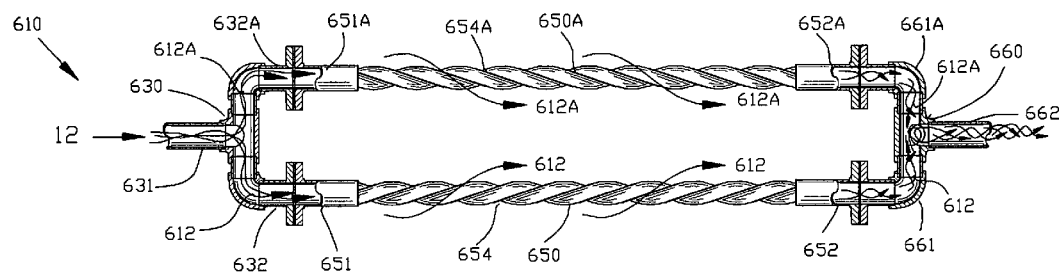
FIG. 6 is a partially cut-away elevation view of the apparatus of FIG. 5 illustrating the liquid flow paths.

FIGS. 5 and 6 are elevation views of a fourth embodiment of an apparatus for mixing a liquid comprising a plurality of parallel static mixing devices. FIG. 6 is a partially cut-away view illustrating the liquid 12 flow through the first and second static mixing devices 650, 650A. Similar parts are labeled with similar reference characters raised by 600 relative to the first embodiment shown in FIG. 1. Parallel static mixing device 610 comprises a first 650 and a second 650A static mixing device configured in a parallel flow relationship. The first static mixing device 650 extends between an inlet port 651 and an outlet port 652, while the second static mixing device 650A extends between an inlet port 651A and an outlet port 652A. The first and second static mixing devices 650,650A comprise a tube 654,654A having a polygonic cross-section, which may be a square cross-section, spirally twisted for forming a plurality of helixes. The helixes extend between the inlet ports 651,651A and the outlet ports 652,652A of the first and second static mixing devices 650,650A. The spirally twisted helix of the first static mixing device 650 is twisted in a first direction, while the spirally twisted helix of the second static mixing device 650A is twisted in a second direction.

Splitter inlet manifold 630 comprises an inlet port 631, a first outlet port 632 and a second outlet port 632A. The inlet port 651 of the first static mixing device 650 is in fluid communication with the first splitter manifold outlet port 632. The first static mixing device 650 is spirally twisted in a first direction for causing the liquid 612 flowing through the first static mixing device 650 to flow in a first helical direction. The inlet port 651A of the second static mixing device 650A is in fluid communication with the second splitter manifold outlet port 632A. The second static mixing device 650A is spirally twisted in a second direction for causing the liquid 612A flowing through the second static mixing device 650A to flow in a second helical direction.

Outlet manifold 660 comprises a first inlet port 661, a second inlet port 661A and an outlet port 662. The first inlet port 661 of the outlet manifold 660 is in fluid communication with the first outlet port 652 of the first static mixing device 650. The second inlet port 661A of the outlet manifold 660 is in fluid communication with the second outlet port 652A of the second static mixing device 650A.

Liquid 12 enters the inlet port 631 of splitter inlet manifold 630 and is split into a first 612 and a second 612A liquid flow stream. First and second liquids 612, 612A exit splitter manifold 630 through the first and second outlet ports 632, 632A. The relative flow rates of the first 612 to the second 612A liquids is dependent upon the relative resistance to flow of the first 650 relative to the second 650A static mixing devices. In this example, static mixing devices 650 and 651 exhibit substantially the same resistance to flow and therefore the flow rates of the first 612 and the second 612A liquids are substantially equal.

The first and second liquids 612, 612A exiting the first and second outlet ports 632, 632A enter the inlet ports 651, 651A of the first and second static mixing devices 650, 650A respectively. The spirally twisted tube 654 of the first static mixing device 650 is twisted in a first direction causing the first liquid 612 to flow in a first helical direction. The spirally twisted tube 654A of the second static mixing device 650A is twisted in a second direction causing the second liquid 612A to flow in a second helical direction.

The first and second liquids 612, 612A exiting the first and second outlet ports 652, 652A of the first and second static mixing devices 650, 650A and enter the first and second inlet ports 661, 661A respectively of the outlet manifold 660.

The recombination of the first liquid 612 flowing with a rotation in a first direction recombining with the second liquid 612A flowing with a rotation in a second direction effects a substantially turbulent flow and mixing during the recombination of the first and, second liquids 612, 612A in outlet manifold 660. The recombined liquids emerge from outlet port 662 of outlet manifold 660.

It should be understood that this embodiment of the present invention may be utilized in combination with any of the other configurations previously describe or alternately may be used independently as a static mixing device.

The apparatus and method of the present invention is suitable for aqueous and non-aqueous liquids containing a wide variety of dissolved, suspended and otherwise contained matter. The apparatus and method of the present invention is suitable for a single or multiple additions of a chemical or chemicals within the liquid. The primary use of the apparatus and method of the present invention is to assist in the removal of dissolved, suspended and otherwise matter contained in the liquid. The apparatus may also be used for diluting a chemical within the liquid or for altering the pH of a liquid flowing through the apparatus.

An important aspect of the apparatus and method of the present invention is the use of static mixers having a spirally twisted tube forming a plurality of helixes. The static mixers are void of internal mixing components enabling coagulated, precipitated or carried matter to flow through the static mixers without encountering flow restricting internal mixing components.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An apparatus for treating a liquid with a first and a second chemical, comprising:
   a conduit for introducing the liquid from a liquid source into a first inlet port of an intake manifold;
   a second inlet port of said intake manifold introducing a first chemical into the liquid;
   a first static mixing device having an inlet port connected in fluid communication with an outlet port of said intake manifold for mixing the first chemical with the liquid;

said first static mixing device comprising a first tube having a generally square cross section;

said first tube being spirally twisted with said generally square cross section forming a first plurality of helixes for implanting a helical flow to the liquid between said inlet port and said outlet port of said first static mixing device for mixing the first chemical with the liquid;

said outlet port of said first static mixing device being connected to a first inlet port of an interconnecting manifold;

a second inlet port of said interconnecting manifold introducing a second chemical into the liquid;

a second static device having an inlet port connected in fluid communication with an outlet port of said interconnecting manifold for mixing the second chemical with the liquid and for eluting the treated liquid from an outlet port of said second static mixing device;

said second static mixing device comprising a second tube having a generally square cross section; and said second tube being spirally twisted with said generally square cross section forming a second plurality of helixes for imparting a helical flow to the liquid between said inlet port and said outlet port of said second static mixing device for mixing the second chemical with the liquid.

2. An apparatus for treating a liquid with a first and a second chemical as set forth in claim 1, wherein said second static mixing device has a cross-section greater than said first static mixing device for providing a high shear first static mixing device and to provide a low shear second static mixing device.

3. An apparatus for treating a liquid with a first and a second chemical as set forth in claim 1, wherein said one of said first and second static mixing device comprises a first and a second spirally twisted tube section;

said first tube section being spirally twisted in a first direction for causing the liquid flowing through said first tube section to flow in a first helical direction; and said second tube section being spirally twisted in a second direction for causing the liquid flowing through said second tube section to flow in a second helical direction.

4. An apparatus for treating a liquid with a first and a second chemical, comprising:

a liquid pump for pumping the liquid from a liquid source into a first inlet port of an intake manifold;

a first chemical pump for pumping a first chemical into a second inlet port of said intake manifold;

a first and a second static mixing device extending between an inlet port and an outlet port;

said first static mixing device comprising a first tube having a generally square cross section;

said first tube being spirally twisted with said generally square cross section forming a first plurality of helixes for imparting a helical flow to the liquid between said inlet port and said outlet port of said first static mixing device for mixing the first chemical with the liquid;

said second static mixing device comprising a second tube having a generally square cross section;

said second tube being spirally twisted with said generally square cross section forming a second plurality of helixes for imparting a helical flow to the liquid between said inlet port and said outlet port of said second static mixing device for mixing the second chemical with the liquid;

said inlet port of said first static mixing device being connected in fluid communication with an outlet port of said intake manifold for mixing the first chemical with the liquid upon flowing along said plurality of helixes;

said outlet port of said first static mixing device being connected to a first inlet port of an interconnecting manifold;

a second chemical pump for pumping a second chemical into a second inlet port of said interconnecting manifold; and said second static mixing device having an inlet port connected in fluid communication with an outlet port of said interconnecting manifold for mixing the second chemical with the liquid and for eluting the treated liquid from an outlet port of said second static mixing device.

5. An apparatus for treating a liquid with a first and a second chemical as set forth in claim 4, wherein said second static mixing device has a cross-section greater than said first static mixing device for providing a high shear first static mixing device and to provide a low shear second static mixing device.

6. An apparatus for treating a liquid with a first and a second chemical as set forth in claim 4, wherein said one of said first and second static mixing device comprises a first and a second spirally twisted tube section;

said first tube section being spirally twisted in a first direction for causing the liquid flowing through said first tube section to flow in a first helical direction; and said second tube section being spirally twisted in a second direction for causing the liquid flowing through said second tube section to flow in a second helical direction.

7. An apparatus for treating water with a fit and a second chemical, comprising:

a water pump for pumping the water from a water source into a first inlet port of an intake manifold;

a first chemical pump for pumping a first chemical into a second inlet port of said intake manifold;

a first static mixing device having an inlet port connected in fluid communication with an outlet port of said intake manifold for mixing the first chemical with the water;

an outlet port of said first static mixing device being connected to a first inlet port of an interconnecting manifold;

said first static mixing device comprising a first tube having a generally square cross section;

said first tube being spirally twisted with said generally square cross section forming a first plurality of helixes for imparting a helical flow to the liquid between said inlet port and said outlet port of said first static mixing device for mixing the first chemical with the liquid;

a second chemical pump for pumping a second chemical into a second inlet port of said interconnecting manifold;

a second static mixing device having an inlet port connected in fluid communication with an outlet port of said interconnecting manifold for mixing the second chemical with the water and for eluting the treated water from an outlet port of said second static mixing device;

said second static device comprising a second tube having a generally square cross section;

said second tube being spirally twisted with said plurality of corners forming a second plurality of helixes for causing the second chemical flowing through and said second tube being spirally twisted with said generally square cross section forming a second plurality of helixes for imparting a helical flow to the liquid between said inlet port and said outlet port of said second static mixing device for mixing the second chemical with the liquid.

8. An apparatus for treating a liquid with a first and a second chemical as set forth in claim 7, wherein said second static mixing device has a cross-section greater than said first static mixing device for providing a high shear first static mixing device and to provide a low shear second static mixing device.

9. An apparatus for treating a liquid with a first and a second chemical as set forth in claim 7, wherein said one of said first and second static mixing device comprises a first and a second spirally twisted tube section;
   said first tube section being spirally twisted in a first direction for causing the liquid flowing through said first tube section to flow in a first helical direction; and
   said second tube section being spirally twisted in a second direction for causing the liquid flowing through said second tube section to flow in a second helical direction.

10. An apparatus for treating waste water for removing dissolved and suspended material contained within the waste water, comprising:
    a water pump for pumping the waste water from a waste water source into a first inlet port of an intake manifold;
    a first chemical pump for pumping a first chemical into a second inlet port of said intake manifold;
    a first static mixing device having an inlet port connected in fluid communication with an outlet port of said intake manifold;
    said first static mixing device comprising a first tube having a generally square cross section;
    said first tube being spirally twisted with said generally square cross section forming a first plurality of helixes for imparting a helical flow to the liquid between said inlet port and said outlet port of said first static mixing device for mixing the first chemical with the liquid;
    an outlet port of said first static mixing device being connected to a first inlet port of an interconnecting manifold;
    a second chemical pump for pumping a second chemical into a second inlet port of said interconnecting manifold;
    a second static mixing device having an inlet port connected in fluid communication with an outlet port of said interconnecting manifold;
    said second static mixing device comprising a second tube having a generally square cross section;
    said second tube being spirally twisted with said plurality of corners forming a second plurality of helixes for causing the second chemical flowing through and
    said second tube being spirally twisted with said generally square cross section forming a second plurality of helixes for imparting a helical flow to the liquid between said inlet port and said outlet port of said second static mixing device for mixing the second chemical with the liquid.

11. An apparatus for treating a liquid with a first and a second chemical as set forth in claim 10, wherein said second static mixing device has a cross-section greater than said first static mixing device for providing a high shear first static mixing device and to provide a low shear second static device.

12. An apparatus for treating a liquid with a first and a second chemical as set forth in claim 10, wherein said one of said first and second static mixing device comprises a first and a second spirally twisted tube section;
    said first tube section being spirally twisted in a first direction for causing the liquid flowing through said first tube section to flow in a first helical direction; and
    said second tube section being spirally twisted in a second direction for causing the liquid flowing through said second tube section to flow in a second helical direction.

13. An apparatus for mixing a liquid with a first chemical, comprising:
    a liquid pump for pumping the liquid from a liquid source into a first inlet port of an intake manifold;
    a second inlet port of said intake manifold introducing a first chemical into the liquid;
    a static mixing device having an inlet port connected in fluid communication with an outlet port of said intake manifold for mixing the first chemical with the liquid;
    said first static mixing device comprising a first tube having a generally square cross section;
    said first tube being spirally twisted with said plurality of corners forming a first plurality of helixes for causing the first chemical flow through
    said first tube being spirally twisted with said generally square cross section forming a first plurality of helixes for imparting a helical flow to the liquid between said inlet port and said outlet port of said first static mixing device for mixing the first chemical with the liquid;
    said outlet port of said static mixing device being connected to a first inlet port of an interconnecting manifold;
    a second static mixing device having an inlet port connected in fluid communication with an outlet port of said interconnecting manifold for mixing the first chemical with the liquid and for eluting the treated liquid from an outlet port of said second static mixing device;
    said second static device comprising a second tube having a generally square cross section; and
    said second tube being spirally twisted with said generally square cross section forming a second plurality of helixes for imparting a helical flow to the liquid between said inlet port and said outlet port of said second static mixing device for mixing the second chemical with the liquid.

14. An apparatus for mixing a liquid with a first chemical as set forth in claim 13, wherein said first inlet port of said intake manifold being normal to said second inlet port of said intake manifold for providing high shear mixing of the first chemical in the liquid.

15. An apparatus for treating a liquid with a first chemical as sat forth in claim 13, wherein said one of said first and second static mixing device comprises a first and a second spirally twisted tube section;
    said first tube section being spirally twisted in a first direction for causing the liquid flowing through said first tube section to flow in a first helical direction; and
    said second tube section being spirally twisted in a second direction for causing the liquid flowing through said second tube section to flow in a second helical direction.

* * * * *